United States Patent
Nerwin

[15] 3,690,451
[45] Sept. 12, 1972

[54] REDUCTION OF INITIAL FILM WINDING RESISTANCE IN CAMERA FILM MAGAZINES

[72] Inventor: Hubert Nerwin, Rochester, N.Y.

[73] Assignee: Eastman Kodak Company, Rochester, N.Y.

[22] Filed: Feb. 17, 1970

[21] Appl. No.: 11,949

[52] U.S. Cl. .............................206/52 F, 242/71.2
[51] Int. Cl. .............................................G03b 17/26
[58] Field of Search......242/71.1, 71.2, 74, 195, 197, 242/198, 199, 200; 352/235, 237, 238; 206/52 F, 59 E

[56] References Cited
UNITED STATES PATENTS

| | | | |
|---|---|---|---|
| 2,983,462 | 5/1961 | Berlings | 242/74 X |
| 3,030,231 | 4/1962 | Bar | 117/237 |
| 2,105,238 | 1/1938 | Wittel | 242/74 |
| 2,172,675 | 9/1939 | Goldberg | 206/53 |

*Primary Examiner*—George F. Mautz
*Assistant Examiner*—Gregory A. Walters
*Attorney*—Robert W. Hampton and D. Peter Hochberg

[57] ABSTRACT

To counteract the tendency of film wound in a supply compartment from clockspringing and resisting initial unwinding, at least the outermost film convolution on the supply roll is transversely corrugated. As the film ages in the magazine, its inherent plasticity causes its clockspringing tendency to diminish and its corrugations to relax, thereby reducing the frictional contact pressure between the outermost film convolution and the compartment walls.

7 Claims, 7 Drawing Figures

PATENTED SEP 12 1972

HUBERT NERWIN
INVENTOR.

BY D. Peter Hochberg
Robert W. Hampton

ATTORNEYS

HURBERT NERWIN
INVENTOR.

ATTORNEYS

3,690,451

REDUCTION OF INITIAL FILM WINDING RESISTANCE IN CAMERA FILM MAGAZINES

BACKGROUND OF THE INVENTION

1. Field of the Invention

The present invention relates to camera film magazines and more particularly to the reduction of the force required to initiate the unwinding of film from a film supply roll wound within a corresponding compartment of a film magazine.

2. Description of the Prior Art

In film magazines of the general type to which the present invention relates, a film supply roll is wound initially in a film supply compartment, from which it subsequently is unwound by the film advancing mechanism of a camera adapted to receive the magazine. In some previously known film magazines, a resilient scroll member is adapted to partially encircle the film supply roll and thereby prevent it from expanding within the film supply compartment. Alternatively, if the film supply roll is wound on a winding core or spool rotatably supported within the supply compartment, the friction between the core or spool and its bearing means may be sufficient to prevent such expansion of the roll, which is commonly referred to as clock-springing. In the absence of such means, however, as in the case of many modern molded plastic film magazines, the clock-springing of the film supply roll causes it to expand until its outermost convolution is in intimate frictional contact with the adjacent internal compartment wall surfaces. As the film ages, its inherent plasticity causes its clockspringing tendency to diminish, but by the time this occurs the entire roll already has expanded, and the outermost roll convolution is retained in engagement with the adjacent wall surfaces. Consequently, when the winding mechanism of the camera initially applies tension to the leading end of the film to unwind film from the supply roll, unwinding rotation of the roll is resisted by its frictional engagement with the compartment walls until sufficient film has been unwound to relieve such friction whereupon the remainder of the film can be unwound by the application of considerably less film tension.

Previously known cameras employing film magazines with which the above-described phenomenon is encountered have been adapted to overcome the initially high resistance of the film to unwinding simply by the application of sufficient film tension to overcome the frictional engagement between the supply compartment walls and the periphery of the supply roll. However, this approach to the problem obviously entails the possibility of tearing or otherwise damaging the film through the application of excessive tension thereto. Also, a camera incorporating such a relatively powerful film advancing mechanism must be provided with a correspondingly strong metering system capable of intermittently blocking movement of the winding mechanism as successive film exposure areas are advanced into exposure position. Furthermore, and perhaps most importantly, in a camera provided with a film advancing mechanism powered by an electric or spring actuated motor, the extra torque required to initiate the film advancing operation dictates that the drive motor be correspondingly larger and more powerful than is necessary to advance the film after the initial unwinding resistance has been overcome.

SUMMARY OF THE INVENTION

In order to reduce the power required to initiate the unwinding of the film supply roll from its corresponding magazine compartment, the present invention employs the simple and inexpensive but heretofore unobvious expedient of transversely corrugating the section of the film which initially comprises at least a portion of the outermost supply roll film convolution; whereby the corrugated portion of the film has an initial effective thickness substantially greater than the thickness of the web material of which the film is comprised. After the film ages in the magazine, its inherent plasticity causes the resiliency of the film to relax and thereby reduces its clock-springing tendency. Concurrently, the initial effective thickness of the corrugated portion of the film gradually diminishes as the film material relaxes and assumes a flatter condition as a result of the gradual relieving of the stresses produced in the film by the corrugating process. Accordingly, by the time the film magazine would normally reach the consumer, the frictional contact pressure between the periphery of the supply roll and the compartment walls has been reduced significantly by the decreased expansive tendency of the film roll accompanied by the increased annular clearance resulting from the reduction of the initial effective thickness of the corrugated portion of the film. By the expedient of transversely corrugating more than the outermost convolution, the frictional contact pressure is reduced by a correspondingly greater extent.

Other features and advantages of the invention will be apparent from the following detailed description of an illustrative preferred embodiment thereof.

BRIEF DESCRIPTION OF THE DRAWINGS

In the detailed description of the preferred embodiment of the invention presented below, reference is made to the accompanying drawings in which like reference characters designate like elements.

DESCRIPTION OF THE ILLUSTRATIVE PREFERRED EMBODIMENT

Because cameras are well known, the present description will be directed in particular to camera elements forming part of, or cooperating more directly with, apparatus in accordance with the present invention. It is to be understood that camera elements not specifically shown or described may take various forms well known to those skilled in the art.

Figure 1:
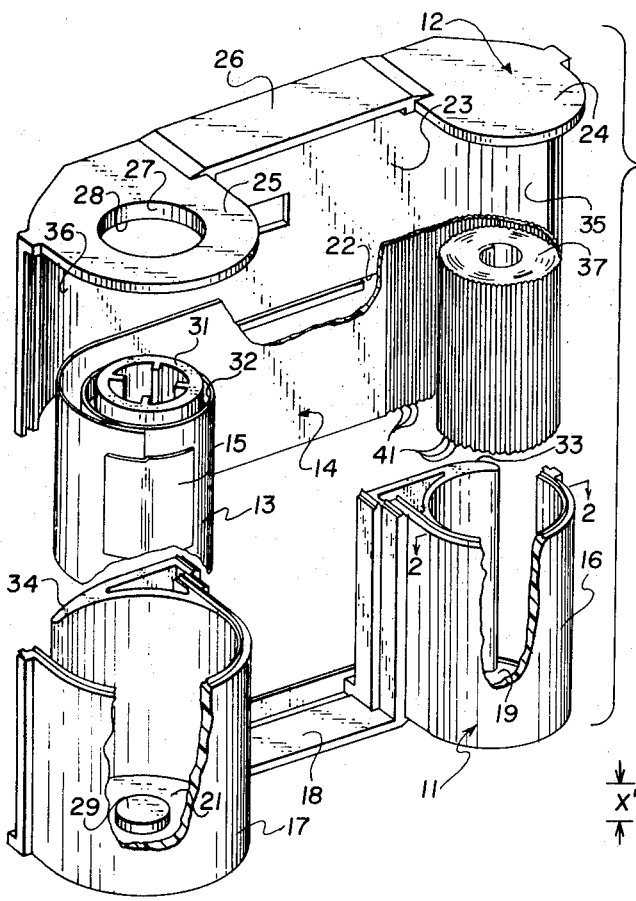
FIG. 1 is an exploded perspective view of a film magazine according to a preferred embodiment of the present invention.
Figure 2:
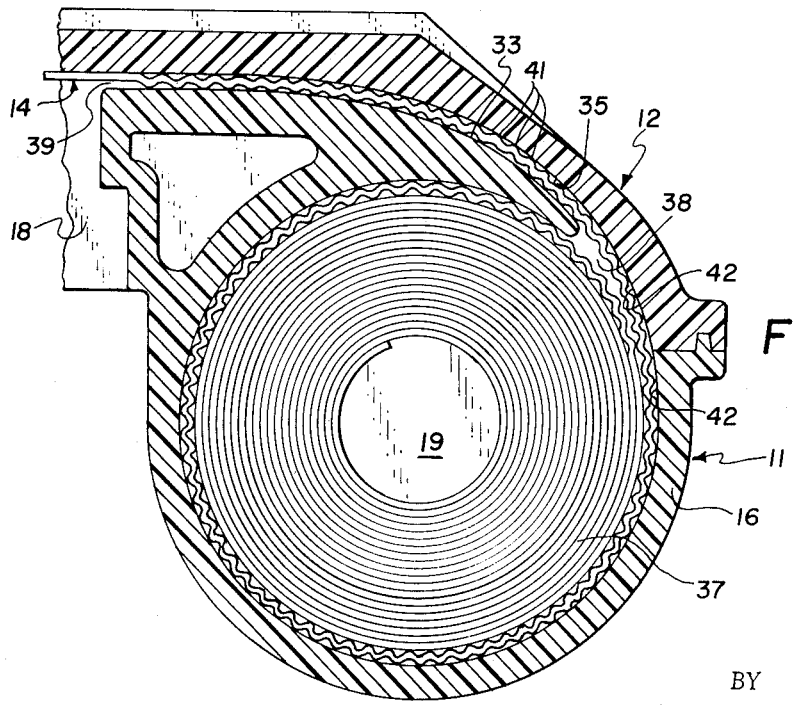
FIG. 2 is an enlarged cross-sectional plan view of the film supply compartment of the film magazine shown in FIG. 1, taken along line 2—2 of the Figure.

The film magazine depicted in FIGS. 1 and 2 of the accompanying drawings to illustrate a preferred embodiment of the invention comprises a lower casing member 11, an upper casing member 12, a film winding core 13 and an elongate strip of photographic film 14 attached at its leading end to the winding core by an adhesive paster tab 15. The lower casing member 11 is formed of molded plastic material and includes a film supply compartment member 16 and a film take-up compartment member 17, joined together by a lower wall member 18. At their lower ends, the film compartment members 16 and 17 are entirely closed by respective end wall members 19 and 21. The upper casing member 12 is also formed of molded plastic material and comprises a relatively thick back wall member 22 curved forwardly toward its opposite ends from a flat forwardly facing film support surface 23. Cover members 24 and 25, adapted to close the upper ends of the respective film supply and take-up compartment members, extend forwardly from the top edge of the back wall member and are joined by upper wall member 26 corresponding to lower wall member 18. As indicated at numeral 27, a circular opening is provided in cover member 25 surrounding a downwardly projecting lip 28, whereas cover member 24 is entirely imperforate.

When the magazine is assembled, the adjacent tongued and grooved surfaces of the upper and lower casing members are fused or otherwise sealed together in mating light tight relation to one another. The winding core is rotatably supported by support stud 29 received in an axial bore, not shown, at the lower end of the core, and by the reception of the upper core hub 31 in opening 27 of cover member 25. The downwardly projecting lip 28 surrounding opening 27 is received in a mating annular groove 32 in the hub member, thereby providing a labyrinth light barrier between the upper end of the winding core and cover member 25. Accordingly, it will be apparent that the assembled magazine provides substantially cylindrical film supply and take-up compartments which are completely light tight except along the film supply and take-up passageways defined respectively between the rearwardly facing wall surfaces 33 and 34 of the lower casing member and the opposing curved end surfaces 35 and 36 of back wall member 22.

Figure 3:
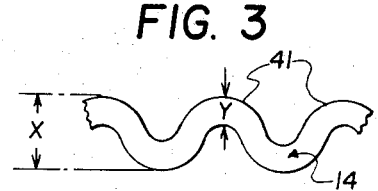
FIG. 3 is an enlarged edge view of the corrugated portion of the film illustrated in FIGS. 1 and 2, showing the profile of the film corrugations when the film is initially loaded into the magazine.

As shown in FIGS. 1 and 2, most of the film is wound initially into film supply roll 37, which is received in film supply compartment 38 with the leading end portion of the film extending through the film passageways and attached to the winding core by paster tab 15. In accordance with the present invention, the portion of the film strip comprising the outermost supply roll convolution extends into the film supply compartment passageway 39, and is provided with a plurality of adjacent transverse corrugations indicated by numeral 41. These corrugations are formed in the film shortly before it is loaded into the magazine by means of relatively cold corrugating dies or rollers. Such dies or rollers are adapted to impart sufficient distortion to the film to cause it to assume an initial corrugated profile similar to that shown in FIG. 3. When the film is distorted in this matter, the corrugated portion of the film has an initial effective thickness X, which is somewhat more than double the web thickness Y of the film. Accordingly, the opposed surfaces 33 and 35 defining film supply compartment passageway 39 are spaced apart by a distance corresponding substantially to the initial effective film thickness X.

Referring now specifically to FIG. 2, it will be seen that as the film supply roll of the freshly loaded magazine clocksprings outwardly, the corrugated portion of the film adjacent the cylindrical internal supply compartment wall surfaces 35 and 42 is urged into contact with those surfaces. Accordingly, if the magazine were loaded immediately into a camera, the power required to initiate unwinding of the supply roll might be somewhat less than in the case of a magazine loaded with uncorrugated film, due to the reduced contact area between the outermost roll convolution and the supply compartment walls, and to the ability of the corrugated film to be stretched progressively and thereby flattened as tension is applied thereto, but would nevertheless be undesirably high.

Figure 4:
FIG. 4 corresponds to FIG. 3 and illustrates the profile of the depicted film corrugations after the film has aged in the magazine.

Since the clockspringing tendency of the film in the freshly loaded magazine is insufficient to produce significant flattening of the film corrugations in contact with the internal wall surfaces of the supply compartment, the maximum peripheral radius of the largest uncorrugated film convolution is substantially equal to the internal radius of the supply compartment minus the initial effective thickness X of the corrugated portion of the film. As the film ages in the magazine, the inherent gradual relieving of its internal stresses causes the film to accommodate itself to its wound condition, which is commonly referred to in the art as "taking a set" As a result of this phenomenon, the clockspringing tendency of the roll is substantially reduced. Concurrently, the film corrugations gradually become less abruptly undulated as a result of the similar relaxation of the opposing stresses in that portion of the film. By the time the magazine normally would reach a consumer, the corrugated portion of the film will have assumed a profile similar to that shown in FIG. 4, whereby its final effective thickness $X'$ is still slightly greater than the web thickness Y but is significantly less than the initial effective thickness X. Consequently, the additional clearance provided in the film supply compartment by the reduction in effective thickness of the film corrugations, combined with the diminished clockspringing tendency of the supply roll, reduces the frictional contact pressure between the film corrugations and the adjacent internal surfaces of the supply compartment, thus allowing the supply roll to rotate in the supply compartment in response to the application of relatively moderate winding torque to the winding core.

Figure 5:
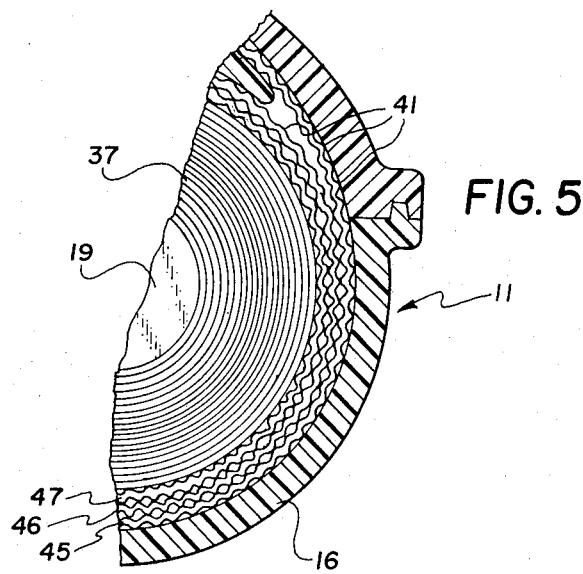
FIG. 5 is a partial, enlarged cross-sectional plan view of a film supply compartment wherein several of the outer convolutions of film wound therein are corrugated according to the invention.

If corrugating only the outermost supply roll convolution fails to produce the desired supply roll freedom in a particular magazine, it should be obvious that the corrugated portion of the film could be lengthened to include one or more additional convolutions, thereby providing a corresponding increase in the annular roll clearance which occurs as the film ages. If the latter expedient is employed, it would be desirable to have the opposing corrugations of adjacent convolutions of film intersect each other to enjoy the full advantage of the invention; otherwise, the opposing corrugations would mesh, thereby reducing their combined effectiveness and creating substantial resistence to the withdrawal of film from the magazine. This aspect is illustrated by reference, initially, to FIG. 2, which depicts a series of alternately elevated and depressed portions which combine to form the corrugated film section. FIG. 5 depicts the aforementioned intersecting, or unmeshed, relationship wherein the corrugations 41 of convolution 45, 46 and 47, as wound in the film supply compartment of FIG. 1, are arranged so that (as viewed at about the six o-clock position in FIG. 5) the elevated portions of convolution 45 intersect the depressed portions (rather than mesh with the elevated portions) of the adjacent inner convolution 46. Obviously, a similar relationship exists between convolution 46 and its adjacent inner convolution 47. One manner of achieving the intersecting relationship between opposing corrugations is to delimit the portion of the film which is to form the outer convolutions of the supply roll into segments corresponding in length of the circumference of the respective convolutions, and to orient the corrugations of contiguous segments so that they are perpendicular to each other and transverse to the lateral edges of the film.

Figure 6:
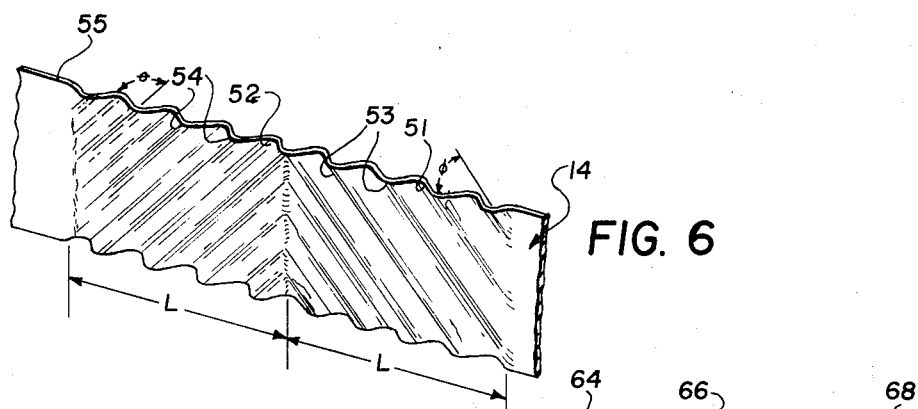
FIGS. 6 and 7 are partial perspective and plan views, respectively, of film having different types of corrugations according to the invention.

For example, referring to FIG. 6, a portion of film 14 is shown, with segments 51 and 52 defined by the dotted lines and corresponding to the outer convolutions of a supply roll. Accordingly, the two segments have lengths L equal to the circumference of the supply roll, which is $\pi \times D$, where D is the diameter of the roll. The slight difference in the circumferences of the convolutions in insignificant. Segment 51 is provided with parallel corrugations 53 intersecting the lateral edge 55 of film 14 an an angle $\phi$ of 45°; segment 52 includes corrugations 54 which intersect edge 55 at an angle $\theta$ of 135°. When wound in a supply roll, opposing corrugations of the outer convolution necessarily intersect and cannot mesh.

Figure 7:
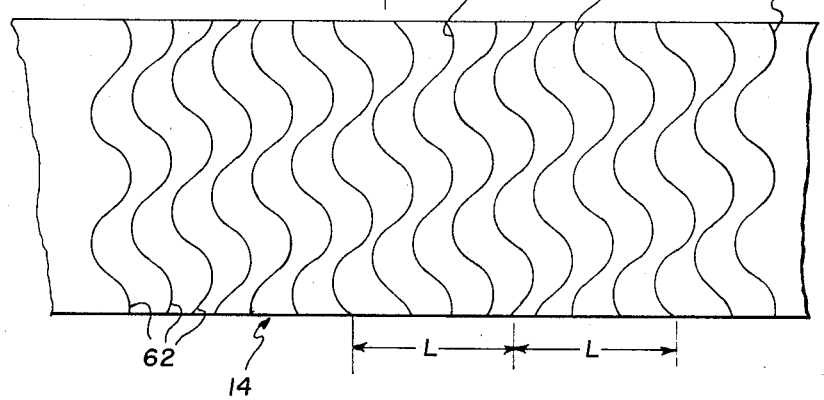

Of course, the film corrugations need not be linear. Accordingly, as shown in FIG. 7, film strip 14 is provided with a series of sinusoidal corrugations 62, and the corrugations can have a shifting phase relationship as shown to assure the intersection of opposed corrugations when it is desired to corrugate more than the outer convolution of the supply roll. For the latter situation, the corrugations of opposed portions of wound film are ideally 180° out of phase to maximize the intersecting effect. This arrangement is indicated in FIG. 7, where convolutions 64 and 66, and 66 and 68 are 180° out of phase, each of the pairs of convolutions being separated by a distance L equal to the circumference of the outer convolution of a supply roll. A particular advantage of such corrugations is that regardless of the roll diameter or slippage of the outer convolutions, there is always an excellent likelihood of substantial intersection of opposing corrugations. One manner of embossing the film with sinusoidal corrugations as described is by use of an embossing roller on whose periphery there is a die having the phase-shifted sinusoidal configuration required for impressing the corrugations in the film. The roller axis would be normal to the path of the film and parallel therewith. To achieve the desired phase relationship of the corrugations, the roller can have, for example, a diameter of 2 times the outer diameter of the film supply roll, and a series of sinusoidal die surfaces running transverse to the roller periphery and sequentially shifted in phase through 360° around the circumference of the roller. Thus, for each revolution of the roller along a strip of film, a section of film equal in length to the two outer convolutions of the film supply roll is embossed. Corrugations in the film at locations separated by distances equal to the circumference of the supply roll are thereby 180° out of phase with one another as desired.

Needless to say, the maximum length of the corrugated portion of the film strip must be determined in accordance with the film metering mechanism of the camera with which the magazine is to be employed in order that the corrugations will be advanced beyond the film exposure position between the two magazine compartments before the film advancement is arrested in preparation for the first film exposure.

Since the corrugated film extending along the film supply compartment passageway gradually decreases in effective thickness, the effectiveness of that portion of the film in preventing light from entering the supply compartment is correspondingly decreased. However, since the curvature of the passageway causes opposite sides of the corrugated film to contact corresponding passageway surfaces at different points along the passageway, such loss in light sealing effectiveness is inconsequential in most cases, particularly in view of the fact that the film corrugations substantially curtail the passage of light along the film surfaces by grazing reflection. The term "corrugations", as used herein, is not intended to be limited to the types of embossing patterns depicted herein. For example, such embossing could conveniently take the form of raised flutings, mounds, pimples, and the like to provide the leading end of the film strip with an initial effective thickness, which thickness subsequently decreases as the film relaxes.

Although the illustrative film magazine described above employs film devoid of protective backing paper, it should be evident that the present invention could also be employed in magazines incorporating that additional feature, in which case the portion of the backing paper initially surrounding the film supply roll could also be transversely corrugated. Also, while the illustrative film magazine is of the type having both a film supply compartment and a film takeup compartment, the invention is equally applicable to magazines which include only a film supply compartment, for example, conventional 35mm film cassettes. Furthermore, it should be recognized that the invention is not limited to film magazines for use in still cameras but is equally applicable to film magazines adapted to be installed in motion picture cameras.

The invention has been described in detail with particular reference to an illustrative preferred embodiment thereof, but it will be understood that variations and modifications can be effected within the spirit and scope of the invention.

I claim:

1. In a film magazine including means for defining a film supply compartment having an inner surface, a film passageway leading from said compartment, and an elongate strip of film having a leading end and a web thickness said film being spirally wound into a film supply roll which is housed within said compartment with said leading end extending from the outermost convolution of said roll into said passageway, said roll being of a size in which said outermost convolution normally engages said supply compartment inner surface, when said roll is in said supply compartment, and said film having an inherent plasticity, a clockspringing tendency, and an initial resiliency, said inherent plasticity, clockspringing tendency, and initial resiliency of said film decreasing as the film ages in the compartment, the improvement wherein:

a section of said strip of film which comprises at least a portion of said outermost of said roll is so substantially transversely corrugated as to have a predetermined initial effective thickness which is greater than said web thickness and is at least initially disposed to contact both said inner surface of said supply compartment and the convolution of said supply roll which is adjacent to said section so that, as said filmstrip ages in said magazine and said initial resiliency decreases, said corrugations relax and said initial effective thickness decreases to reduce the frictional contact pressure between the outermost film convolution and the supply compartment inner surface.

2. A film magazine according to claim 1 in which said corrugated section of said film has an initial effective thickness equal to at least twice the web thickness of said strip.

3. A film magazine according to claim 1 in which said corrugated section of said strip of film completely encircles said film supply roll and extends therefrom into said passageway.

4. A film magazine according to claim 1 further including means defining an internal film take-up compartment and a rotatable winding core housed within said take-up compartment, and wherein said elongate strip of film includes an uncorrugated leading end section attached to said winding core.

5. In an elongate strip of film having a web thickness and adapted to be at least partly wound into a film supply roll for insertion into a film supply compartment of a film magazine, said compartment having an inner surface and said roll being of a size in which the outermost convolution normally engages said supply compartment inner surface, when said roll is in said supply compartment, and said film having an inherent plasticity, a clockspringing tendency, and an initial resiliency said inherent plasticity, clockspringing tendency and initial resiliency of said film decreasing as the film ages in the compartment, the improvement wherein:

a section of said strip of film which comprises at least a portion of said outermost convolution is so substantially transversely corrugated as to have a predetermined initial effective thickness which is greater than said web thickness and is at least initially disposed to contact both said inner surface of said supply compartment and the convolution of said supply roll which is adjacent to said section, so that, as said filmstrip ages in said compartment and said initial resiliency decreases, said corrugations relax and said initial effective thickness decreases to reduce the frictional contact pressure between the outermost film convolution and the supply compartment inner surface.

6. In a container for web material comprising:

a wall defining a generally cylindrical supply chamber having an inner surface;

a passageway extending through said wall from said supply chamber; and a web spirally wound into a roll within said supply chamber, said roll having at least one inner convolution and an adjacent outer convolution and being of a size in which said outer convolution normally engages said supply chamber inner surface, when said roll is in said supply chamber, and said web having a thickness, an inherent plasticity, a clockspringing tendency, and an initial resiliency, said inherent plasticity, clockspringing tendency, and initial resiliency of said web decreasing as the web ages in said chamber, the improvement wherein:

a section of said outer convolution is so substantially transversely corrugated that it has a predetermined initial effective thickness which is greater than said web thickness and is at least initially disposed to contact both said inner surface of said supply chamber and said inner convolution, so that, as said web ages in said supply chamber and said initial resiliency decreases, said corrugations relax so as to decrease said initial effective thickness and thereby reduce the frictional contact pressure between the outer web convolution and said inner surface of said supply compartment.

7. In an elongate strip of film for being wound into a roll and loaded into a film supply compartment of a film magazine, said compartment having an inner surface and said roll being of a size in which said outermost convolution of said roll normally engages said supply compartment inner surface, when said roll is in said supply compartment, and said strip of film having a web thickness, an inherent plasticity a clockspringing tendency, and an initial resiliency, said inherent plasticity, clockspring tendency, and initial resiliency of said film decreasing as said film ages in said compartment, the improvement wherein:

a section of said strip of film is so substantially transversely corrugated as to have a predetermined initial effective thickness which is greater than said web thickness, said corrugations defining a first corrugated segment operable to form said outermost convolution of said roll and a second corrugated segment operable to form the adjacent inner convolution thereof, the corrugations of said first segment and said second segment intersecting both lateral edges of said film the crests of each corrugated segment of said inner and outer convolutions transversely contacting the other of said corrugated segments along a distance which is less than the width of the strip of film, so that the corrugations of said second segment and the corrugations of said first segment are in unmeshed relationship with respect to the corrugations of said second segment, when said film is wound into the film supply roll, whereby, as said film strip ages in said compartment and said initial resiliency decreases, said corrugations relax and said initial effective thickness decreases to reduce the frictional contact pressure between said outermost film convolution and said inner surface of said supply compartment.

* * * * *

PO-1050
(5/69)

UNITED STATES PATENT OFFICE
CERTIFICATE OF CORRECTION

Patent No. 3,690,451          Dated September 12, 1972

Inventor(s) Hubert Nerwin

It is certified that error appears in the above-identified patent and that said Letters Patent are hereby corrected as shown below:

Column 5, line 22, replace "of", first occurrence, should read
    -- to --.
            line 35, replace "an" (first occurrence) with
            --at--.

Column 7, line 13, after "outermost" insert --film convolution--;
            line 13, after "said" (second occurrence) insert --supply--.

Signed and sealed this 8th day of May 1973.

(SEAL)
Attest:

EDWARD M. FLETCHER, JR.
Attesting Officer

ROBERT GOTTSCHALK
Commissioner of Patents